Patented Oct. 31, 1950

2,528,186

UNITED STATES PATENT OFFICE 2,528,186

COATED TETRA-ALKYL THIURAM DISULFIDES

Cletius D. Stanley, Wyandotte, Mich., assignor to Sharples Chemicals Inc., a corporation of Delaware No Drawing. Application October 9, 1946, Serial No. 702,087

7 Claims. (Cl. 260—567)

The present invention pertains to the manufacture of tetra-alkyl thiuram disulfides. It is concerned particularly with the manufacture of tetra-methyl, tetra-ethyl, and other thiuram disulfides, substituted by four identical or non-identical alkyl groups, in the form of solid particles by a procedure which avoids the health hazard heretofore encountered in manufacture and use of such particles.

In the practice of this invention, the manufacture of the tetra-alkyl thiuram disulfide is accomplished by the well-known procedure of oxidizing a water-soluble salt of a dialkyl dithiocarbamic acid in aqueous solution. The oxidation reaction results in formation of the tetra-alkyl thiuram disulfide and precipitation of this product in the form of particles from the aqueous solution. The present invention is concerned with avoidance of dusting problems incident to the drying, shipment and use of these particles.

A feature of the invention consists in the fact that it provides a procedure by which the hazard to the health of operators due to flying about of particles of the formed thiuram disulfide is avoided, both in use of the product and in all stages during the manufacturing operation.

A further feature of the invention consists in the fact that it provides a finished product which is unusually resistant to dusting and hence provides better protection to the health of operators than do analogous products treated by prior art procedures.

A further feature of the invention consists in the fact that it provides a procedure in which a greater economy is obtained in use of oily coating materials in the coating operations than can be attained by any prior art procedure by which an adequately coated product may be obtained.

As is well known, tetra-alkyl thiuram disulfides are useful as rubber accelerators. Like certain other products employed in the rubber industry, however, they are hazardous to the health of operators both in the plants in which they are produced, and in the compounding operations in which they are employed prior to the vulcanization or other treatment to form rubber products. Among the proposals heretofore made for diminution or elimination of the dusting problem incident to use of this and other products in rubber have been suggestions that the product be coated with a liquid coating agent which is solid or a viscous liquid at room temperatures, the liquid coating agent being applied either to the dried product, or to a suspension of the product in an aqueous medium.

The application of the coating agent to a dried product, either by direct treatment of the product with the coating agent while dry or by suspension of the dried product in an aqueous medium to which the coating material is added, does not constitute an adequate solution of the problem.

In the event that the coating material is applied to the dry, finished product, the operators who conduct the drying and coating operations are necessarily exposed to the dust hazard. On the other hand, treatment in aqueous suspension of the undried product with sufficient coating material to provide a substantially dustless product when dry entails a considerable loss of coating agent, much of which fails to adhere to the particles and is washed away with the filtrate.

In the practice of the present invention, these difficulties are avoided and products having excellent dispersing characteristics are obtained by coating the tetra-alkyl thiuram disulfide particles in two stages. In the first stage, a coating is applied in the presence of the aqueous medium from which the thiuram disulfide particles are formed and precipitated, only a part of the final coating being applied at this stage. The aqueous medium is then removed from the particles of tetra-alkyl thiuram disulfide so coated, and a further quantity of the same or different coating material is thereafter applied to said coated particles.

Further features and advantages of the invention, and the manner in which these advantages are attained, will be evident from a reading of the following specific examples and discussion.

Example 1

An aqueous solution of sodium dimethyl dithiocarbamate is prepared in a wooden tank equipped with cooling coils and agitator and vented to the atmosphere. In conducting the reaction, 14.5 gallons of water, 126 pounds of 50% sodium hydroxide and 144 pounds of aqueous 50% dimethylamine are first introduced and thereafter 121 pounds of carbon disulfide are gradually pumped in while providing agitation and maintaining the temperature below 20° C.

The resulting solution is transferred to a second wooden reaction vessel provided with an agitator, cooling coils and means for venting gaseous reaction products to the remote atmosphere. A solution of 99 pounds of sodium nitrite in 30 gallons of water is then introduced followed by 1.1 pounds of a commercial dispersing agent of the alkaryl sulfonate type and 2.2 pounds of white oil. Oxidation is effected by introducing concentrated hydrochloric acid at a rate of 3.5 pounds per minute into the reactor while the reactants are maintained in a vigorous state of agitation and at a temperature below 35° C. The reaction, which is complete when the pH of the mixture has fallen to about 5, is attended by evolution of nitrogen oxide fumes and simultaneous deposition of tetramethyl thiuram disulfide in finely divided form.

The slurry of tetramethyl thiuram disulfide is filtered, washed thoroughly and the moist cake is placed in a tray dryer of conventional design, and is maintained at a temperature of 95–100° C. until the moisture content is reduced below 0.5%.

The dried powder, which contains almost 1% of white oil in the form of a coating on the individual particles and shows only a small tendency to disperse into the atmosphere with normal handling, is treated in 80 pound batches in a Baker Perkins mixer with 3.2 pounds of stearic acid per batch. The tetramethyl thiuram disulfide and the stearic acid are brought to 75–80° C. and are mixed at this temperature for 30 minutes. The temperature is then reduced to 40° C. by circulation of cold water in the jacket of the mixer, which is operated during this stage. The final product is a flour-fine white powder, slightly unctuous to the touch, having practically no tendency to dust and being admirably suited for incorporation into rubber formulations.

Example 2

By a procedure entirely analogous to that of Example 1, tetra-ethyl thiuram disulfide is prepared by substitution of a stoichiometric equivalent of 100% diethyl amine for the aqueous dimethyl amine. In this instance, however, it is necessary to dry the wet-oiled product at temperatures not much in excess of 54° C. since the product melts at 63–67° C. This white oil treated thiuram disulfide exhibits even less tendency to dust during the drying and second-coat steps than does the methyl analogue.

Example 3

By the procedure of Example 1 sodium dimethyl dithiocarbamate is prepared and oxidized with sodium nitrite and hydrochloric acid but with substitution of oleic acid for the white oil. When oleic acid is employed, the dispersing agent preferably is omitted from the oxidation batch. The product, after being filtered, washed and dried, is introduced into the Baker Perkins mixer together with 3% by weight of paraffin wax (130–135° F. melting point). The materials are heated to 85° C. and are thoroughly mixed at this temperature for about 30 minutes, cooling water being then substituted for the heating steam to cause the temperature to fall to 40° C. prior to termination of the mixing operation. The product is nondusting, of good appearance and is readily dispersible.

Example 4

By the procedure of Example 1 sodium dimethyl dithiocarbamate is prepared, oxidized to tetramethyl thiuramdisulfide in the presence of a coating agent and the said oxidation product is filtered, dried and intimately mixed with further coating material. In this instance, 6 pounds of a natural rubber latex containing 40% of solids are substituted for the white oil of Example 1 in the first coating stage.

Example 5

By the general procedure of Example 1 a doubly coated tetramethyl thiuram disulfide is prepared. In the wet coating operation, amyl naphthalene in an amount equal to 1.5 parts per hundred parts of finished product is introduced, in lieu of the white oil. No wetting or emulsifying agent is employed during the oxidation step and, in further variance from the procedure of Example 1, said amyl naphthalene is introduced to the aqueous slurry of tetramethyl thiuram disulfide after the addition of the hydrochloric acid is complete and prior to the filtration operation. The oil-containing slurry is agitated vigorously for 20 minutes. Approximately 15% of the amyl naphthalene is washed away with the filtrate.

In the second coating operation the dry, incompletely coated, product is thoroughly contacted in the Baker Perkins mixer with 2% by weight of glycerine at about 30° C. The product is nondusting, somewhat less free-flowing than the stearic acid or paraffin treated products, but is readily dispersible in rubber formulations.

Example 6

In the manufacture of doubly coated tetramethyl thiuram disulfide the procedure of Example 1 is followed in all particulars with the exception that ammonium persulfate is employed as oxidizing agent in place of nitrous acid. This modification involves omission of the sodium nitrite from the oxidation-reaction batch and substitution of an aqueous solution of ammonium persulfate for the hydrochloric acid. The persulfate solution is introduced gradually into the agitated mixture of dithiocarbamate, water, white oil and dispersing agent, the temperature being maintained below 40° C.

Example 7

By the general procedure of Example 1, coated tetramethyl thiuram disulfides are prepared. In this instance 20% sulfuric acid is employed instead of hydrochloric acid.

Example 8

The procedure of Example 5 is repeated, except that amyl naphthalene is substituted for the glycerine in the second coating step.

As is evident from a consideration of the foregoing illustrative examples, the present invention may be practiced in conjunction with various methods of manufacture of tetra-alkyl thiuram disulfides involving precipitation of said thiuram disulfides as solid particles from an aqueous solution. Any methods of this nature may be employed for the oxidation of the water-soluble salt of the dialkyl dithiocarbamic acid, as for example those involving use of nitrous acid, alkyl nitrites, hydrogen peroxide, ammonium or alkyl ammonium persulfates as oxidizing agents.

The first applied coating agent is a hydrophobic material and may be introduced into the aqueous slurry of tetra-alkyl thiuram disulfide or into the dithiocarbamate solution prior to oxidation or even prior to the preparation of the dithiocarbamate itself. It may be a liquid or a low-melting non-brittle solid (e. g., a polymeric substance). It should be sufficiently non-volatile to remain in effective amounts on the particles during the various processing steps culminating in the dry-coating step. It should be substantially insoluble in dilute aqueous solutions and have sufficient chemical stability to withstand the processing conditions. Many types of substances fulfill the said requirements, among which may be mentioned higher aliphatic hydrocarbons, alkyl-substituted aromatic hydrocarbons, higher alcohols, higher organic acids or esters, natural oils, higher ethers, low melting derivatives of dithiocarbamic acid such as tetraethyl thiuram monosulfide, etc. White oil (refined petroleum oil) and Red oil (commercial oleic acid) are entirely satisfactory from the standpoint of performance and economy.

The amount of liquid coating agent applied to the thiuram disulfide in aqueous suspension may be as high as 5% but in general I have found that an amount ranging from about 0.5 to 3% based upon the weight of finished product imparts adequate non-dusting properties to the dried product and that the use of about 1% gives a product which may be handled with safety by trained operators and at the same time results in almost complete utilization of the agent in the form of a coating on the particles. Use of appreciably smaller proportions fails to retard the dusting properties of the dry product sufficiently, and use of markedly higher proportions results in incomplete utilization as well as in formation of a product which is difficult to dry. Normally solid substances must be applied while in the molten state. The coating material may be dispersed in the aqueous medium by any practicable method as by mild agitation in the presence of an emulsifying agent or by vigorous agitation without use of such agent, or may be introduced in the form of a stable emulsion into the mixture to be treated.

In treatment of the dried, incompletely coated product with further anti-dusting coating agent any mixing device capable of bringing about intimate contact between all the particles of the thiuram disulfide and the coating agent may be employed. The various agents suitable for application of the initial coating may be employed in the dry-mix second coating treatment and, in fact, the same oily coating agent may be employed in each coating step. Particularly effective in the production of coated thiurams having good appearance and feel are normally solid, low melting fatty acids such as stearic acid. They are best applied in the molten state.

While it is essential that the coating agent used in the initial coating step be a hydrophobic material, the anti-dusting agent employed in the later coating step may be either hydrophobic or hydrophilic, so long as it has a sufficiently low melting point to be liquid at temperatures convenient for use in the coating operation, and is solid or a viscous liquid at ordinary temperatures. The amount of coating agent applied in this second step will depend to some extent upon the nature of the substance itself and upon the amount of coating agent previously applied. In general, a total of from 2 to 10% of coating agent applied in the two steps gives a satisfactory product.

Various modifications are possible within the scope of my invention and I do not wish to be limited except by the following claims.

I claim:

1. In the manufacture of coated tetra-alkyl thiuram disulfides, the process comprising oxidizing a salt of a diakyl dithiocarbamic acid in aqueous solution to form particles of the desired tetra-alkyl thiuram disulfide, coating the tetra-alkyl thiuram disulfide particles with a relatively non-volatile hydrophobic liquid coating agent in amount from 0.5% to 5% based on the weight of said particles while in the presence of the aqueous medium from which they are formed and precipitated, removing the aqueous medium from the coated particles of tetra-alkyl thiuram disulfide, drying said particles, and thereafter applying a normally solid anti-dusting coating agent in molten form to said previously-coated and dried particles.

2. In the manufacture of coated tetra-alkyl thiuram disulfides, the process comprising oxidizing with agitation a salt of a dialkyl dithiocarbamic acid in aqueous solution in the presence of a hydrophobic relatively non-volatile liquid coating agent to form particles of the desired tetra-alkyl thiuram disulfide, said coating agent being present in amount from 0.5% to 3% based on the weight of said tetra-alkyl thiuram disulfide, and thereby coating the tetra-alkyl thiuram disulfide particles with said hydrophobic liquid coating agent while in the presence of the aqueous medium as they are formed and precipitated therefrom, removing the aqueous medium from the coated particles of tetra-alkyl thiuram disulfide, drying said particles and thereafter applying a normally solid anti-dusting coating agent in molten form to said previously-coated and dried particles.

3. In the manufacture of coated tetra-alkyl thiuram disulfides, the process comprising oxidizing a salt of a dialkyl dithiocarbamic acid in aqueous solution to form particles of the desired tetra-alkyl thiuram disulfide, adding with agitation a hydrophobic relatively non-volatile liquid coating agent to the aqueous slurry containing the tetra-alkyl thiuram disulfide particles formed and precipitated from aqueous solution by the oxidation reaction, said coating agent being present in amount from 0.5% to 3% based on the weight of said particles, and thereby coating the tetra-alkyl thiuram disulfide particles with said hydrophobic liquid coating agent while in the presence of the aqueous medium from which they are formed and precipitated, removing the aqueous medium from the coated particles of tetra-alkyl thiuram disulfide, drying said particles, and thereafter applying a normally solid anti-dusting coating agent in molten form to said previously-coated and dried particles.

4. In the manufacture of coated tetra-alkyl thiuram disulfides, the process comprising oxidizing a salt of a dialkyl dithiocarbamic acid in aqueous solution to form particles of the desired tetra-alkyl thiuram disulfide, coating the tetra-alkyl thiuram disulfide particles with a relatively non-volatile hydrocarbon oil in amount between 0.5% and 3% based on the weight of said particles while in the presence of the aqueous medium from which they are formed and precipitated, removing the aqueous medium from the coated particles of tetra-alkyl thiuram disulfide, drying said particles, and thereafter applying a fatty acid which is solid at normal temperatures in molten form to said tetra-alkyl thiuram disulfide particles to form a coating of said fatty acid about the said oil-coated and dried particles.

5. In the manufacture of coated tetra-alkyl thiuram disulfides, the process comprising oxidizing a salt of a dialkyl dithiocarbamic acid in aqueous solution to form particles of the desired tetra-alkyl thiuram disulfide, coating the tetra-alkyl thiuram disulfide particles with a relatively non-volatile hydrocarbon oil in amount approximately 1% by weight of said particles while in the presence of the aqueous medium from which they are formed and precipitated, removing the aqueous medium from the coated particles of tetra-alkyl thiuram disulfide, drying said particles, and thereafter applying molten stearic acid to the said coated and dried tetra-alkyl thiuram disulfide particles to form a coating of stearic acid about the said particles in amount sufficient to bring the total coating up to from 2% to 10%.

6. In the manufacture of coated tetra-methyl thiuram disulfide particles, the process comprising oxidizing a salt of dimethyl dithiocarbamic acid in aqueous solution to form particles of tetra-methyl thiuram disulfide, coating the tetra-methyl thiuram disulfide particles with a relatively non-volatile hydrophobic liquid coating agent in amount from 0.5% to 3% based on the weight of said particles; while in the presence of the aqueous medium from which they are formed and precipitated, removing the aqueous medium from the coated particles of tetra-methyl thiuram disulfide, drying said particles, and thereafter applying a normally solid anti-dusting coating agent in molten form to said coated and dried particles.

7. In the manufacture of coated tetra-methyl thiuram disulfide particles, the process comprising oxidizing a salt of dimethyl dithiocarbamic acid in aqueous solution to form particles of tetra-methyl thiuram disulfide, coating the tetra-methyl thiuram disulfide particles with approximately 1% by weight of white oil while in the presence of the aqueous medium from which they are formed and precipitated, removing the aqueous medium from the coated particles of tetra-methyl thiuram disulfide, drying said particles, and thereafter applying a molten fatty acid which is solid at normal temperatures to the said coated and dried tetra-methyl thiuram disulfide particles to form a coating of said fatty acid about the said particles.

CLETIUS D. STANLEY.

REFERENCES CITED

The following references are of record in the file of this patent:

UNITED STATES PATENTS

| Number | Name | Date |
|---|---|---|
| 1,475,492 | Krase | Nov. 27, 1923 |
| 2,325,194 | Olin | July 27, 1943 |
| 2,326,984 | Tomlin | Aug. 17, 1943 |